May 6, 1941.  A. BARTSCH  2,240,602
CHILD'S DISH
Filed March 16, 1939
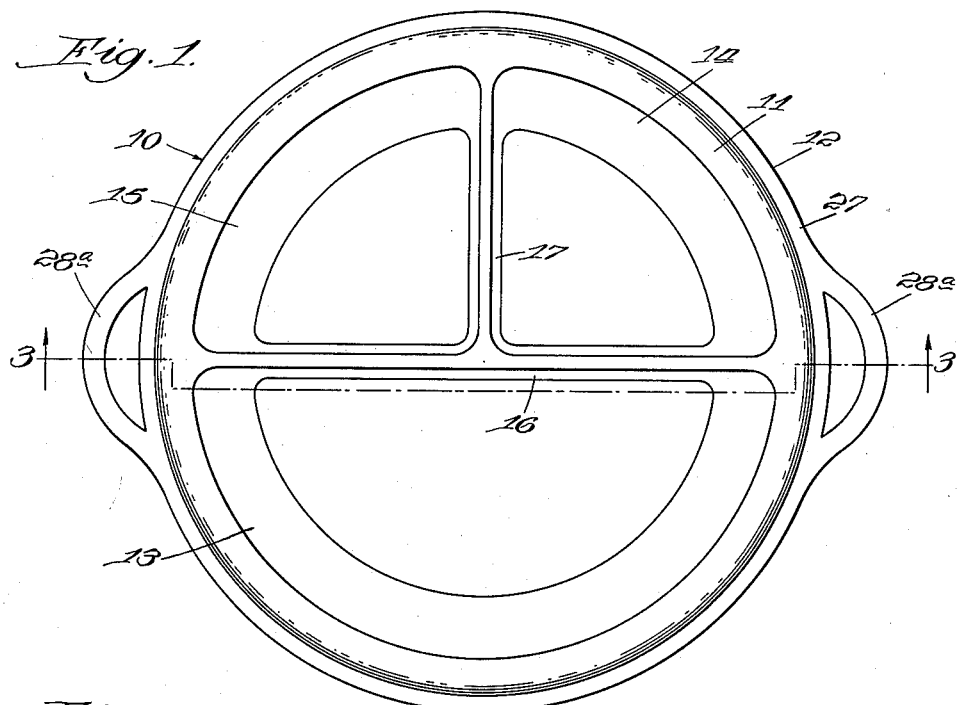
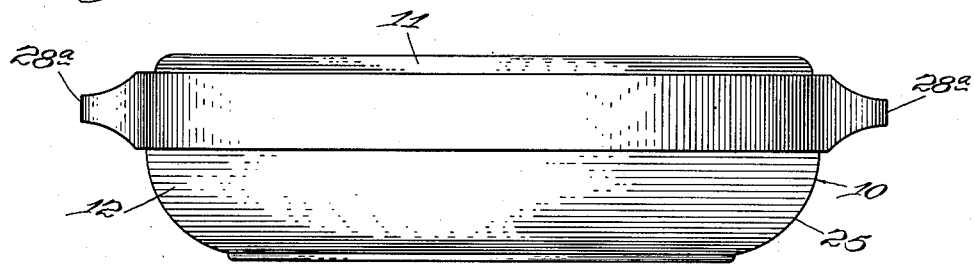
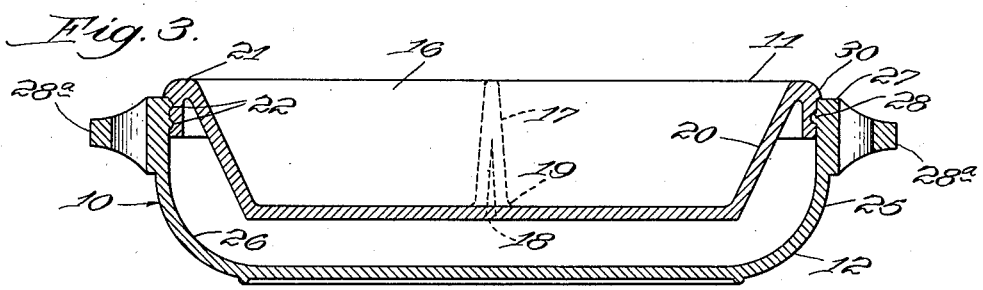
Inventor:
Albert Bartsch.
By Chritton, Wiles, Davies, Hirschl & Dawson.
Attys.

Patented May 6, 1941

2,240,602

UNITED STATES PATENT OFFICE 2,240,602

CHILD'S DISH

Albert Bartsch, Chicago, Ill.

Application March 16, 1939, Serial No. 262,292

1 Claim. (Cl. 65—15)

This invention relates to an improved child's dish and a method of manufacturing it.

The so-called child's dishes have heretofore been made in cumbersome heavy form, with the dish and thermal elements permanently combined, and the only means for adding the hot water being a small opening in the top or side of the dish. These units were therefore quite likely to get dirty, and the base was practically uncleanable. At the same time the assembly of them was a difficult job, the cost of manufacture was high, and the price of the unit was entirely out of line with the ordinary pocket book.

In accordance with the present invention a child's dish is provided which may be readily disassembled for cleaning or the addition of hot water, is made of cheap materials, and may be manufactured to sell at a cost of as little as 30% to 40% of the cheapest available child's dishes of comparable quality heretofore on the market.

This has been accomplished by the manufacture of both elements of the dish from plastic material, preferably phenol formaldehyde resin, both top and bottom being threaded to provide immediate locking or unlocking of the elements.

The invention is illustrated in the drawing in which Figure 1 is a plan view of the assembled dish; Figure 2 is the side elevation thereof; and Figure 3 is a sectional elevation taken along the line 3—3 in Figure 1.

The dish 10 consists of a dish element 11 and a thermal element 12. The dish element is divided into a major compartment 13 and two smaller compartments 14 and 15 by the diametric partition 16 and the radial partition 17.

Both in manufacturing such an element and in its use, it is desirable that the wall thickness be substantially uniform throughout. The partitions 16 and 17 are therefore divided at the base as indicated in Figure 3 to form openings 18. The partitions are thus in the form of open inverted V's. This is not only of assistance in avoiding fracture upon expansion and contraction, but is also of assistance in cleaning the dish by avoiding sharp corners. Preferably the base of the partition is somewhat rounded as indicated at 19.

The side wall 20 of the dish element is provided with an extension 21 which is bent outwardly to form an annular flange. This flange is provided with a threading 22 which may be cross-threaded if desirable in order to lock the element by turning in either direction. Preferably the threading should lock the element by a single twist.

The partitions 16 and 17 provide a convenient hole for screwing or unscrewing the elements into or out of assembly.

The thermal element 12 is provided with deep side walls 25 in order to form a bowl 26 beneath the dish element. At the top the thermal element is provided with a slightly thickened annulus 27 which is threaded at 28 to complement the threads of the dish element. The thermal element is likewise provided with a pair of handles 28a which may be secured to the rim in any desired fashion either at the time of or after the casting of the element.

The flange 21 of the dish element is provided with a small shoulder 30 which overlaps the rim 27 of the thermal unit. The flange at this point is rounded and the shoulder provides a stop upon assembling the elements and also provides an anti-leak device and greatly improves the appearance of the dish.

In manufacturing the dish the thermal and dish elements are separately cast from plastic material. The dish element is cast with a three-element mold, the threaded flange and upper portion of the dish being cast from a divided form and the under portions of the dish being cast from a single piece. After casting, the bottom mold may be withdrawn outwardly and the upper molds removed by a slight sideward twist motion. The thermal element is likewise cast from a three-piece mold.

I claim:

A child's dish comprising a dish element and a thermal element adapted to embrace said dish and provide a closed intermediate chamber, said dish element having at least two open compartments separated by a wall adapted to serve as a handle for rotating the dish element with respect to said thermal element, the dish element having a male thread on its rim portion, and a thermal element having a complementary female threaded portion in its top marginal portion.

ALBERT BARTSCH.